US011337421B2

(12) United States Patent
Ahari et al.

(10) Patent No.: US 11,337,421 B2
(45) Date of Patent: May 24, 2022

(54) METHOD FOR PRODUCING ANTIMICROBIAL NANOFILMS PACKAGING COVER BASED ON TITANIUM NANO-DIOXIDE THROUGH EXTRUSION FOR EXTENSION OF FOOD SHELF-LIFE

(71) Applicants: Hamed Ahari, Tehran (IR); Guity Karim, Tehran (IR); Seyed AmirAli Anvar, Tehran (IR); Saeed Paidari, Tehran (IR); Seyedeh Atefeh Mostaghim, Tehran (IR); Alireza Sajadi Mazinani, Tehran (IR)

(72) Inventors: Hamed Ahari, Tehran (IR); Guity Karim, Tehran (IR); Seyed AmirAli Anvar, Tehran (IR); Saeed Paidari, Tehran (IR); Seyedeh Atefeh Mostaghim, Tehran (IR); Alireza Sajadi Mazinani, Tehran (IR)

( * ) Notice: Subject to any disclaimer, the term of this patent is extended or adjusted under 35 U.S.C. 154(b) by 0 days.

(21) Appl. No.: 16/726,718

(22) Filed: Dec. 24, 2019

(65) Prior Publication Data

US 2020/0205403 A1 Jul. 2, 2020

(51) Int. Cl.
| | |
|---|---|
| *A01N 25/10* | (2006.01) |
| *C08J 3/22* | (2006.01) |
| *C08K 3/08* | (2006.01) |
| *C08K 3/34* | (2006.01) |
| *A01N 59/16* | (2006.01) |
| *A01N 59/00* | (2006.01) |
| *B65D 65/40* | (2006.01) |
| *B29B 7/90* | (2006.01) |
| *B29C 48/00* | (2019.01) |
| *B29C 48/88* | (2019.01) |
| *C08J 5/18* | (2006.01) |
| *B29C 48/385* | (2019.01) |
| *B29C 48/08* | (2019.01) |
| *B29C 48/40* | (2019.01) |
| *B29L 31/00* | (2006.01) |
| *B29K 23/00* | (2006.01) |
| *B29K 505/14* | (2006.01) |
| *B29K 509/02* | (2006.01) |
| *B29K 105/00* | (2006.01) |
| *B29K 105/16* | (2006.01) |

(52) U.S. Cl.
CPC ............ *A01N 25/10* (2013.01); *A01N 59/00* (2013.01); *A01N 59/16* (2013.01); *B29B 7/90* (2013.01); *B29C 48/022* (2019.02); *B29C 48/08* (2019.02); *B29C 48/385* (2019.02); *B29C 48/40* (2019.02); *B29C 48/911* (2019.02); *B65D 65/40* (2013.01); *C08J 3/226* (2013.01); *C08J 5/18* (2013.01); *C08K 3/08* (2013.01); *C08K 3/346* (2013.01); *B29K 2023/0633* (2013.01); *B29K 2105/0011* (2013.01); *B29K 2105/162* (2013.01); *B29K 2505/14* (2013.01); *B29K 2509/02* (2013.01); *B29L 2031/712* (2013.01); *C08J 2323/06* (2013.01); *C08K 2003/0806* (2013.01); *C08K 2201/005* (2013.01); *C08K 2201/011* (2013.01)

(58) Field of Classification Search
CPC ........ A01N 25/10; A01N 59/16; A01N 59/00; C08J 3/226; C08J 5/18; C08J 2323/06; C08K 3/08; C08K 3/346; C08K 2201/011; C08K 2201/005; C08K 2003/0806; B65D 65/40; B29B 7/90; B29B 7/005; B29C 48/022; B29C 48/911; B29C 48/385; B29C 2948/92704; B29C 48/08; B29C 48/10; B29C 48/40; B29C 48/92; B29C 48/0022; B29L 2031/712; B29K 2023/0633; B29K 2505/14; B29K 2509/02; B29K 2105/0011; B29K 2105/162

See application file for complete search history.

(56) References Cited

U.S. PATENT DOCUMENTS

| | | | | |
|---|---|---|---|---|
| 9,192,625 | B1* | 11/2015 | Joshi | D04H 1/4382 |
| 9,686,997 | B2* | 6/2017 | Pagotto Simoes | A01N 59/16 |
| 2005/0226967 | A1* | 10/2005 | Bringley | B65D 81/28 |
| | | | | 426/133 |
| 2009/0004433 | A1* | 1/2009 | Privitera | B32B 27/18 |
| | | | | 428/143 |
| 2011/0142899 | A1* | 6/2011 | Lagaron Abello | B82Y 30/00 |
| | | | | 424/405 |
| 2012/0108722 | A1* | 5/2012 | Thetford | C08J 3/226 |
| | | | | 524/275 |
| 2012/0308666 | A1* | 12/2012 | Zielecka | C23C 18/08 |
| | | | | 424/618 |
| 2013/0189334 | A1* | 7/2013 | DiSalvo | A61K 8/19 |
| | | | | 424/401 |
| 2013/0315972 | A1* | 11/2013 | Krasnow | A01N 59/20 |
| | | | | 424/409 |

(Continued)

*Primary Examiner* — Jeffrey M Wollschlager

(74) *Attorney, Agent, or Firm* — Barry Choobin; Patent 360

(57) ABSTRACT

The present invention relates to a method for producing antimicrobial nanofilms packaging cover based on Titanium nano-dioxide through extrusion for extension of food shelf-life. The method comprises the steps of providing nano-silver and nano-clay particles which are antimicrobial agents to enhance mechanical properties of packaging in food industry; and evaluating effects of nano clay and nano silver packaging on the growth of these bacteria within 6 days of shelf life keeping at 4° C. The silver and clay nanoparticles are analyzed using AFM, SEM, FESEM, EDX, FTIR and TEM, wherein the size of clay and silver nanoparticles are measured 15 nm and 35 nm, respectively.

5 Claims, 6 Drawing Sheets

(56) References Cited

U.S. PATENT DOCUMENTS

| | | | |
|---|---|---|---|
| 2014/0205847 A1* | 7/2014 | Falla | B32B 7/02 |
| | | | 428/476.9 |
| 2014/0220153 A1* | 8/2014 | Pagotto Simoes | A01N 59/16 |
| | | | 424/618 |
| 2015/0257381 A1* | 9/2015 | Ophir | C09D 7/45 |
| | | | 424/404 |
| 2015/0335012 A1* | 11/2015 | Chen | C08J 3/126 |
| | | | 424/419 |
| 2016/0030475 A1* | 2/2016 | Ching | A61K 33/12 |
| | | | 424/489 |
| 2017/0206997 A1* | 7/2017 | Al-Harthi | H01B 1/24 |
| 2017/0354143 A1* | 12/2017 | Rolfe | A01N 25/34 |
| 2021/0039438 A1* | 2/2021 | Kim | B60C 7/14 |

* cited by examiner

METHOD FOR PRODUCING ANTIMICROBIAL NANOFILMS PACKAGING COVER BASED ON TITANIUM NANO-DIOXIDE THROUGH EXTRUSION FOR EXTENSION OF FOOD SHELF-LIFE

FIELD OF THE INVENTION

The present invention relates to method for producing antimicrobial nanofilms packaging cover based on Titanium nano-dioxide through extrusion for extension of food shelf-life. More particularly, to the nano clay and nano silver particles as antimicrobial agents to enhance mechanical properties of packaging in food industry.

BACKGROUND AND PRIOR ART

Today, antibacterial packaging plays a major role for enhancing shelf life of food products. Applications of nano-clay and nano-silver as antimicrobial agents as well as their ability to enhance mechanical properties of packaging have made them important in the food industry.

In the conventional method for producing an organic copolymer, the organic copolymer coating a coating film. More specifically, the coated and minute organic copolymer comprising antimicrobial property with UV curability and dispersibility. There has been increasing demand for synthetic resin film which has antimicrobial activity that can be used for various purposes according to the higher public health and health awareness. Especially in the case of small electronic devices, as the public may be in frequent contact with the public goods or the user's hand with a number of mobile phones available there is a recent trend that is created by using a material with antibacterial performance. Furthermore, the personal hygiene consciousness is strengthened due to the fear of not properly safeguarding the disease as swine flu surge, there is demand for antimicrobial materials.

In the recent past years, the consumption level is much improved, and the various ingredients increases the packing and distribution of food ingredients, including those imported from abroad. If you must suppress the growth of microorganisms and minimize the deterioration of the product packaging in antimicrobial situation, the development of materials urgent.

Generally, the coating film is made of synthetic resin, which is the most processing zeolite, such as vinyl chloride, zinc, in most cases the solid phase kneads the fine powder pulverized to the inorganic antibacterial agent in the masterbatch and is obtained by molding it into a film made of the antimicrobial material.

There are few research papers published as the prior art documents. The prior art document relates to critical review of the migration potential of nanoparticles in food contact plastics. Authors: Störmer A, Bott J, Kemmer D, Franz R. Trends in Food Science & Technology. 2017; 63:39-50. Then, the prior art document relates to effect of surface structure on photocatalytic activity of TiO2 thin films prepared by sol-gel method. Authors: Yu J, Zhao X, Zhao Q. Thin solid films. 2000; 379(1-2):7-14. Those papers were disclosed in nanoparticles destroy bacterial wall using connection of free radicals, enzymes and different other proved methods.

Another prior art document relates to fabrication of silver nanoparticles and their antimicrobial mechanisms. Authors: Song H, Ko K, Oh I, Lee B. Eur Cells Mater. 2006; 11(Suppl 1):58. Clay NPs not only enhance physicochemical properties of packaging such as tensile strength and water-gas barrier properties, but also high proportion of surface to volume as well as its layered characteristics leads to reduction of microbial load.

Another prior art document relates to nanocomposites in food packaging a review in advances in diverse industrial applications of nanocomposites. Authors: de Azeredo H M C, Mattoso L H C, McHugh T H. InTech; 2011. This document also relates to measuring the migration of silver from silver nanocomposite polyethylene packaging based on TiO2 into *Penaeus semisulcatus* using titration comparison with migration methods. Authors: Hosseini R, Ahari H, Mahasti P, Paidari S. Fisheries Science. 2017; 83(4):649-59. These papers were disclosed in melt-mixing, Sol-Gel and other methods are implemented for production of Nanocomposites films. Among them melt-mixing which melts Low Density Polyethylene (LDPE) and mixes NPs using extruder is considered remarkably by packaging industry.

Yet another prior art document relates to susceptibility of *Vibrio parahaemolyticus* to various environmental stresses after cold shock treatment. Authors: Lin C, Yu R-C, Chou C-C. International journal of food microbiology. 2004; 92(2):207-15. Also, the prior art document relates to Nano-clay migration from food packaging materials. Authors: Echegoyen Y, Rodríguez S, Nerín C. Food Additives & Contaminants: Part A. 2016; 33(3):530-9. Those papers disclosed *Vibrio parahaemolyticus* is a gram negative, moderately halophilic bacterium usually living in marine area. It is recognized as a pathogen for human and numerous different diseases are reported caused by consumption of these bacteria such as vomiting, fever, abdominal cramps and diarrhea.

Further, the prior art document relates to survival of *Vibrio parahaemolyticus* and *Aeromonas hydrophila* in sea bream (*Sparus aurata*) fillets packaged under enriched CO2 modified atmospheres. Authors: Provincial L, Guillén E, Alonso V, Gil M, Roncalés P, Beltrán J A. International journal of food microbiology. 2013; 166(1):141-7. Asia is reported to have the highest illness rate resulted from consumption of sea food such as shrimp contaminated with *V. parahaemolyticus*. Although the optimal growth of *Vibrio parahaemolyticus* is 35-27° C., there are number of reports of their growth at 47° C.

In order to solve the above-mentioned problem, the present invention provides a method for producing antimicrobial nanofilms packaging cover based on Titanium nano-dioxide through extrusion for extension of food shelf-life. The method evaluates the effects of silver and clay nano-packaging on *Vibrio parahaemolyticus* in Shrimp samples. Also, physicochemical properties of NPs before and after incorporation of them into nanocomposites were evaluated to determine the effects of size, shape and distribution of NPs on antimicrobial properties In accordance with an embodiment of the present invention, nano packaging could decrease colony counts significantly more than one logarithmic cycle (P<0.05). Also, a synergistic effect can be seen in the packaging containing both nano-clay and nano-silver particles. In order to reduce bacterial load and increase shelf life of perishable food products the silver and clay nano particles in nanocomposites can be used.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE INVENTION

One or more drawbacks of conventional method and additional advantages are provided through the current method for producing nano-silver packaging cover based on Titanium nano-dioxide through extrusion for extension of food shelf-life as claimed in the present disclosure. Additional features and advantages are realized through the technicalities of the present disclosure. Other embodiments and aspects of the disclosure are described in detail herein and are considered to be a part of the claimed disclosure.

In an embodiment of the present invention is provided a method for producing antimicrobial nanofilms packaging cover based on Titanium nano-dioxide through extrusion for extension of food shelf-life.

Accordingly, potential hazards resulting from consumption of shrimp is contaminated with *Vibrio parahaemolyticus*. The antibacterial effects of nano-clay and nano-silver composites against *Vibrio parahaemolyticus* were proved. In fact, increasing the percentage of nano particles in nanocomposites leads to the reduction of the bacterial load and therefore, shelf life is prolonged. Moreover, the antibacterial characteristics of nano-clay particle are proved. However, according to the results, the efficiency of nanocomposites is reduced after shelf life period and this causes re-growth of *Vibrio parahaemolyticus* bacteria. SEM, FESEM, TEM, and AFM analysis characterized incorporated nanoparticles in each packaging and revealed the antibacterial effects of low size nano particles in nanocomposites.

It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

It is to be noted, however, that the appended drawings illustrate only typical embodiments of the present subject matter and are therefore not to be considered for limiting of its scope, for the invention may admit to other equally effective embodiments. The detailed description is described with reference to the accompanying figures. In the figures, the left-most digit(s) of a reference number identifies the figure in which the reference number first appears. The same numbers are used throughout the figures to reference like features and components. Some embodiments of system or methods in accordance with embodiments of the present subject matter are now described, by way of example, and with reference to the accompanying figures, in which.

Figure 1:
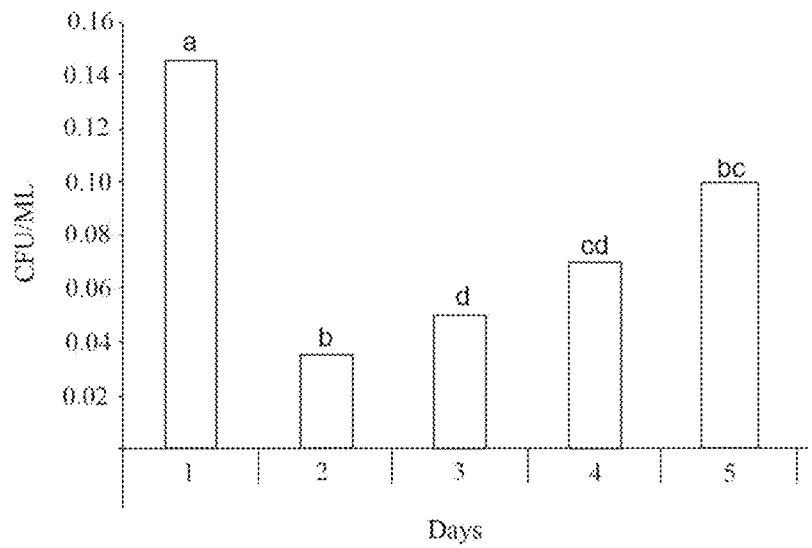
FIG. 1 illustrates graphical representation of mean comparison of *V. parahaemolyticus* count in shelf life period, in accordance with an embodiment of the present subject matter.

The figures depict embodiments of the present subject matter for the purposes of illustration only. A person skilled in the art will easily recognize from the following description that alternative embodiments of the structures and methods illustrated herein may be employed without departing from the principles of the disclosure described herein.

DETAILED DESCRIPTION OF THE INVENTION

While the embodiments of the disclosure are subject to various modifications and alternative forms, specific embodiments thereof have been shown by way of example in the figures and will be described below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof used in the disclosure, are intended to cover a non-exclusive inclusion, such that a device, system, assembly that comprises a list of components does not include only those components but may include other components not expressly listed or inherent to such system, or assembly, or device. In other words, one or more elements in a system or device proceeded by "comprises . . . a" does not, without more constraints, preclude the existence of other elements or additional elements in the system or device.

An embodiment of the present invention relates to method for producing antimicrobial nanofilms packaging cover based on Titanium nano-dioxide through extrusion for extension of food shelf-life. The method comprising the steps of: heating nano-silver and nano-clay particles in an oven at 80° C. for 2-3 hours to vaporize any trapped water between the silver and clay nano particles; adding the nano particles to a container to mix with determined amount of Low-Density Polyethylene (LDPE); feeding the mixed LDPE and nano particles (NPs) to a twin extruder, after 3 times of mixing LDPE and NPs; and feeding masterbatch to another extruder to synthesize a final nanocomposite film, wherein the blowing cooled air is provided into the twin extruder to produce the final nanocomposite film.

Accordingly, temperature zones of extruder are set 125, 135, 150, 160 and 180° C. Different formulas were inserted into the extruder to produce distinguished nano packaging containing different percentages of clay and silver nano particles. Such that each profile having rod shaped LDPE mixed with nano particles, is cut and mixed in a container and backed to extruding circle to ensure unique distribution of particles in masterbatches like, Cut profile. Final masterbatch is entered to another extruder to synthesize the final film. Therefore, avoid interference of different formulas; the extruder container and its shaft are cleaned using pure LDPE before and after every stage of process. Eventually, blowing the cold air into the extruder produced the final nanocomposite. The average size of each film is measured by using a digital micrometre. The synthesized nano packaging is kept in a dark container to avoid exposure to light and contamination with surrounding microbes.

FIG. 1 illustrates the graphical representation of mean comparison of *V. parahaemolyticus* count in shelf life period. There are significant differences between control and nanocomposites on each day of experiment (P<0.05). However, there are no significant differences between day 2 and 3. Since *V. parahaemolyticus* colony reduction is stopped in the second day and started to growth in higher rates in the third day of experiment (P<0.05).

Figure 2:
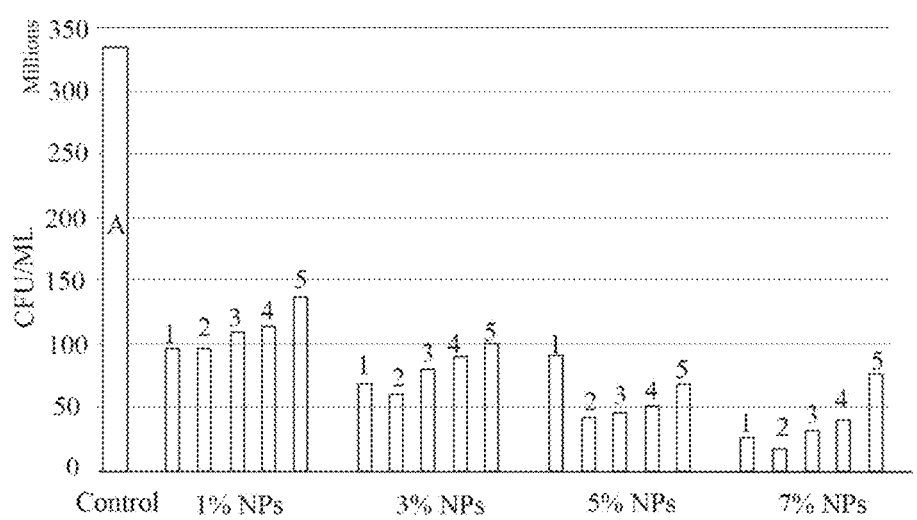
FIG. 2 illustrates graphical representation of mean comparison of LSD at $P<0.05$, in accordance with an embodiment of the present subject matter.

FIG. 2 illustrates the graphical representation of mean comparison of LSD at P<0.05. An increase in percentage of clay and silver nano particles has led to reduction of *V. parahaemolyticus* count. Also, antibacterial effects of low-size clay nano particles were proved against gram negative *V. parahaemolyticus*. According to FIG. 2, there is a significant but low difference between control and 1% nano particles nanocomposites. However, increasing total percentage of nano clay and nano silver to 7% made the difference much higher.

Figure 3:
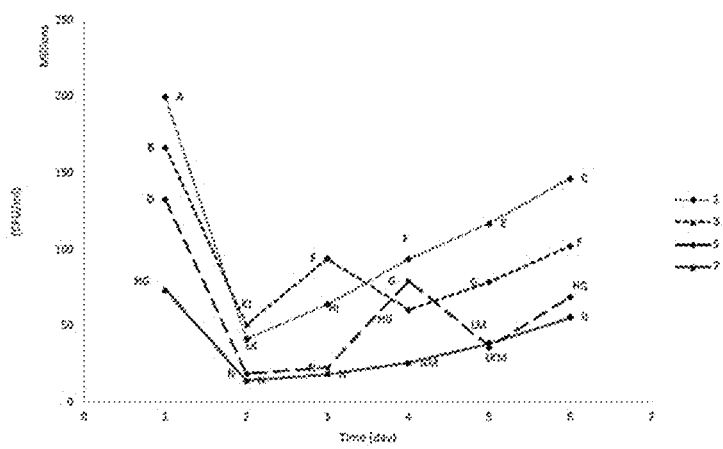
FIG. 3 illustrates graphical representation of colony-forming unit (CFU) changes during shelf life, in accordance with an embodiment of the present subject matter.

FIG. 3 illustrates the graphical representation of CFU changes during shelf life. FIG. 3 shows in mean *V. parahaemolyticus* colony count on each day of experiment there is a significant difference between the first and the 6th day of experiment. Also, on the rest of the days there is a significant difference between 1% and 7% nanocomposites. Also, according to FIGS. 2 and 3, synergistic effect of clay and silver is revealed. Such that the comparison of nanocomposites containing only silver nanoparticles (nanocomposites No. 1, 6, 11 and 16) and nanocomposites containing both silver and clay particles (75% silver and 25% clay) showed that application of clay nanoparticles intensified antibacterial activity of packaging against *V. parahaemolyticus* (P<0.05). Moreover, a remarkable antibacterial characteristic was revealed for clay nanoparticles since the nanocomposites containing no silver nanoparticles also had inhibitory effects of *V. parahaemolyticus*.

In accordance with an embodiment of the present invention relates to preparation of *Vibrio parahaemolyticus*. In order to process for preparing the *V. parahaemolyticus* comprising the steps of activating lyophilized *V. parahaemolyticus*, wherein the obtained powder was mixed with BHIB media and transferred to nutrient broth. To ensure that the growing bacteria were *V. parahaemolyticus*, a sterile loop of prepared nutrient broth is transferred to a sterile tube containing peptone water saline 3%. After 24 hours keeping at 36° C. incubator. The sterile loop of the turbid tube is transferred on TCBS plate such that growing green colonies are determined for the obtained bacteria are *V. parahaemolyticus*. Finally, to prepare a 0.5 McFarland stock, specific amount of bacteria is transferred to 100 CC distilled water and absorbance (0.08 for 0.05 McFarland) was read using spectrophotometer.

Further, the process for inoculation and packaging, to sterilize nano packaging from any contamination, they are immersed in ethanol 70% for 20 minutes. Then, nanocomposites are kept under UV light for about 7 hours before staring packaging. Such that shrimp samples are cut into 10-gram batches and inserted into a Pulsipher bag; each group of samples are shaken with the prepared inoculate for about 1 minute. After depleting inoculate water from samples, they are inserted into the produced packaging and hot sealed.

In addition, for the bacterial analysis of nano packaged samples, they are kept at refrigerator for 6 days. To prepare serial dilutions, the samples are kept out of refrigerator to reach 25° C. Then, each sample is inserted into a blender bag and mixed with 90 CC distilled water, and 1 CC of the solution is transferred to the test tube containing peptone water saline 3%. After 21-24 hours keeping in incubator at 37° C., serial dilution is prepared from the first test tube. The total count test is carried out for each sample using PCA and TCBS Agar. To determine any previous cross-contamination each sample is examined for *S. aureus* and *E. coli* in BPA and VRBA, respectively. Also, before inoculation, each sample is examined for presence of *V. parahaemolyticus* to avoid any bias.

As shown in FIGS. 4-7, which illustrate the graphical images for analysis of nano particles and produced films. This analysis evaluates size and shape of nano particles before and after incorporation in the film, High Resolution Transmission Electron Microscopy (HR-TEM), Field Emission Scanning Electron Microscopy (FESEM) and High-Resolution Atomic Force Microscopy (AFM) were used. Also, Scanning Electron Microscopy (SEM) was used to measure nano particles size and distribution in the produced films.

Figure 4:
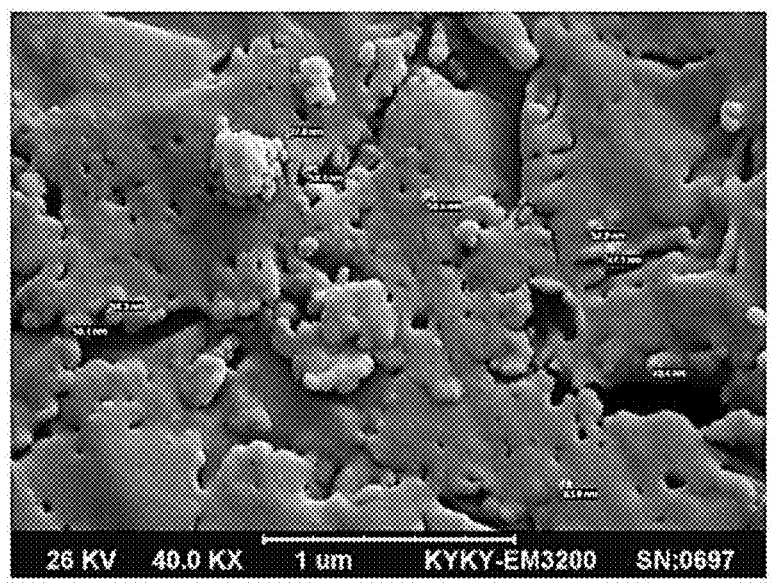
FIG. 4 illustrates Scanning Electron Microscopy (SEM) image of Nano-clay (left) and nano-silver particles, in accordance with an embodiment of the present subject matter.

FIG. 4 illustrates graphical image of SEM, in accordance with an embodiment of the present invention which relates to clay nano particles diameter which is about 20-30 nm despite the claims of the producer (claimed to be 1-2 nm). As nano clay particles have high surface to volume ratio, they agglomerate rapidly during time and it is probably the reason of this differences.

Figure 5:
FIG. 5 illustrates Field Emission Scanning Electron Microscopy (FESEM) image of nano-silver particles, in accordance with an embodiment of the present subject matter.

FIG. 5 illustrates graphical image of FESEM of silver nano particles and silver nano particles with 40-50 nm size. FESEM is used to measure size and distribution of clay and silver nano particles. However, DLS experiment showed that average size of nano particles is 30-35 nm. This difference is mainly due to agglomeration of nano particles.

Figure 6:
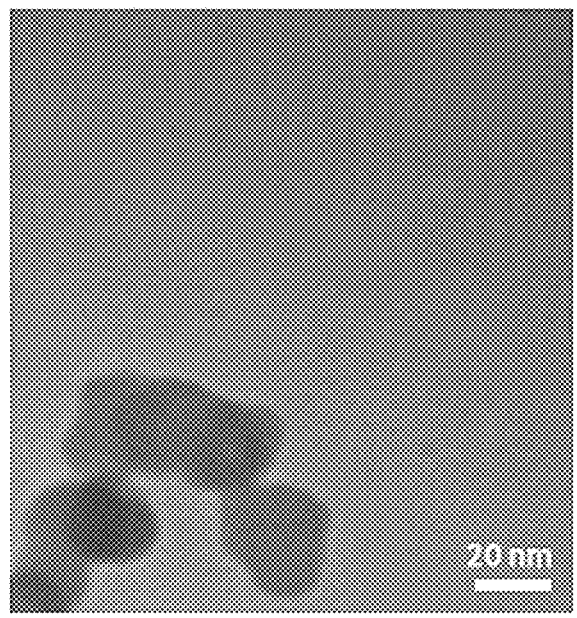
FIG. 6 illustrates High Resolution Transmission Electron Microscopy (HR-TEM) image of nano-silver particles, in accordance with an embodiment of the present subject matter.

FIG. 6 illustrates graphical image of HR-TEM that is used to evaluate the size and shape of silver nano particles, showing the silver nano particles diameter is about 30-35 nm.

Figure 7A:
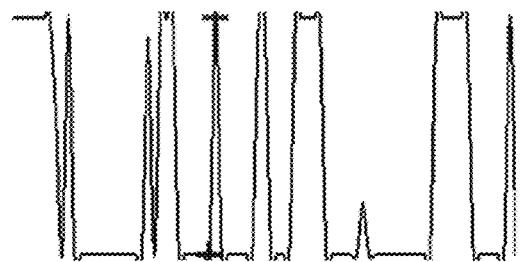
FIG. 7*a* illustrates Atomic Force Microscopy (AFM) image of nano-clay particles, in graphical form, in accordance with an embodiment of the present subject matter.
Figure 7B:
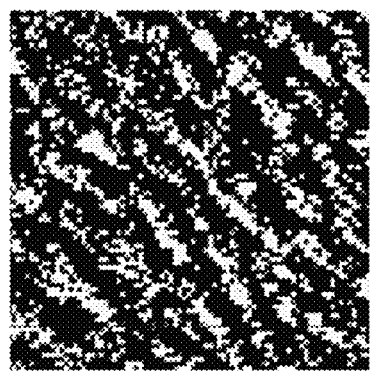
FIG. 7*b* illustrates Atomic Force Microscopy (AFM) image of nano-clay particles, in tabular form, in accordance with an embodiment of the present subject matter.

FIG. 7a illustrates graphical image of Atomic Force Microscopy (AFM) that is used to evaluate a wide range of nano particles in 3D. FIG. 7b illustrates Atomic Force Microscopy (AFM) in tabular form. The axis X, Y and Z axis of clay nano particles are surveyed and measured by using AFM offline software showing that the diameter evaluated particle are 20 nm (0.02 um dxz, 0.02 um dxy).

Accordingly, analysis of SEM, FESEM, HR-TEM and AFM are used to characterize nano particles. Also, FTIR, DLS and XRD analysis are carried out (data not shown) to evaluate any potential confounding factor (e.g. any chemical compound that may exert antibacterial effect of shrimp samples). According to the mentioned experiments Ag and clay (Al, Mg) were the only nanoparticles existing in the nanocomposites.

In accordance with advantages of the present invention, subject matter relates to method of producing antimicrobial nanofilms packaging cover based on Titanium nano-dioxide through extrusion for extension of food shelf-life. The antibacterial effects of nano-silver and nano-clay composites are proved against *Vibrio parahaemolyticus*. Therefore, the increase in percentage of nano-silver and nano-clay particles in nanocomposites leads to the reduction of the bacterial load and therefore, shelf life is prolonged. Moreover, antibacterial characteristics of clay particles are proved. However, according to the results, the efficiency of nanocomposites is reduced after shelf life period and this caused re-growth of *Vibrio parahaemolyticus* bacteria. SEM, FESEM, TEM, and AFM analysis characterized incorporated nanoparticles in each packaging and revealed the antibacterial effects of low size NPs in nanocomposites.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

Although embodiments for the present subject matter have been described in language specific to structural features, it is to be understood that the present subject matter is not necessarily limited to the specific features described. Rather, the specific features and methods are disclosed as embodiments for the present subject matter. Numerous modifications and adaptations of the system/component of the present invention will be apparent to those skilled in the art, and thus it is intended by the appended claims to cover all such modifications and adaptations which fall within the scope of the present subject matter.

What is claimed is:

1. A method for producing antimicrobial nanocomposite packaging cover, the method comprising the steps of:

heating nano-silver and nano-clay particles in an oven at a predetermined temperature to vaporize any trapped water;

upon vaporization of the trapped water, adding the nano-silver and nano-clay particles into a container;

mixing the nano-silver and nano-clay particles with a pre-determined amount of Low-Density Polyethylene (LDPE) to obtain a mixture;

feeding the mixture into a first extruder to obtain a masterbatch;

feeding the masterbatch into a film extruder to extrude a final nanocomposite film, wherein the final nanocomposite film comprises about 7% of the nano-silver and nano-clay particles, and the nano-silver and the nano-clay particles are present in a proportion of about 75:25; and evaluating the final nanocomposite film by contacting the final nanocomposite film with shrimp samples for 6 days at 4° C.

2. The method as claimed in claim 1, wherein the nano-silver and nano-clay particles are 35 nm and 15 nm in size respectively.

3. The method as claimed in claim 1, wherein the method further comprises:

subjecting the feed in the first extruder to a temperature in the range of 120-180° C.

4. The method as claimed in claim 1, wherein the nano-silver and nano-clay particles are heated in the oven at a temperature in the range of 70-90° C. for 2-3 hours.

5. A method for producing an antimicrobial nanocomposite packaging film, the method consisting of the steps of:

heating nano-silver and nano-clay particles in an oven at a predetermined temperature to vaporize any trapped water;

upon vaporization of the trapped water, adding the nano-silver and the nano-clay particles into a container;

extruding a mixture of the nano-silver and the nano-clay particles with a pre-determined amount of Low-Density Polyethylene (LDPE) to obtain a masterbatch; and
extruding the masterbatch to obtain a final nanocomposite film.

\* \* \* \* \*